Nov. 20, 1951  H. E. BRAMBLE  2,575,485
LOAD LIFTING DEVICE
Filed June 5, 1950

Inventor
Henry E. Bramble
By Walter J. Jason
Attorney

Patented Nov. 20, 1951

2,575,485

UNITED STATES PATENT OFFICE 2,575,485

LOAD LIFTING DEVICE

Henry E. Bramble, San Diego, Calif.

Application June 5, 1950, Serial No. 166,243

10 Claims. (Cl. 254—8)

This invention relates generally to load-lifting appliances and more particularly to an improved form of elevating truck which is powered by an electric motor.

An object of the present invention is to provide a mobile lifting truck having mechanism of improved construction for elevating the movable platform and maintaining the same in a horizontal position while being raised and lowered.

Another object of the invention resides in providing in a load-lifting truck an improved actuating means for raising and lowering the platform.

Another object of the invention is to provide an improved mobile, electric motor powered lifting truck which is easily maneuverable into operative position and readily operable to raise and lower heavy loads, such as the weight of an automobile.

A further object of the invention is the provision of a mobile lifting truck having a simple, compact, and economical construction which renders it convenient in use and effective in operation.

Other objects and features of the present invention will be readily apparent to those skilled in the art from the following specification and appended drawing wherein is illustrated a preferred form of the invention, and in which.

Figure 1:
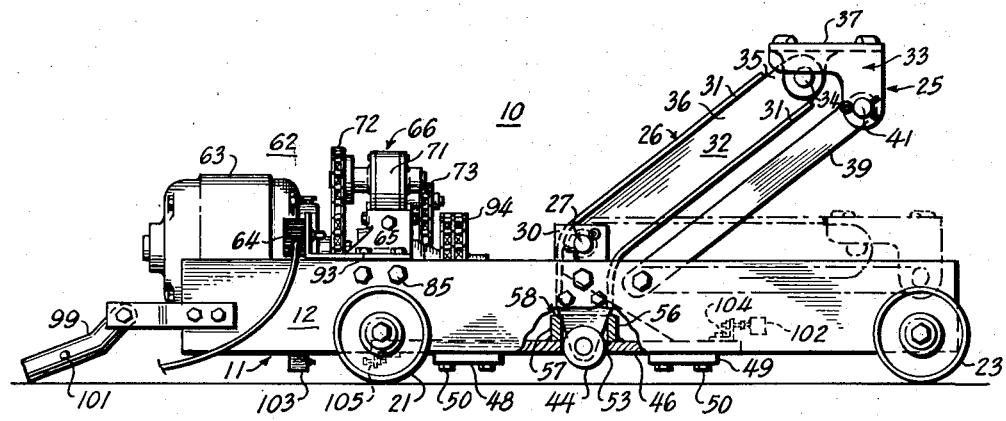
Figure 1 is a side elevational view of an elevating truck embodying the invention, the lifting platform being shown in raised position by full lines and in lowered position by chain lines.
Figure 2:
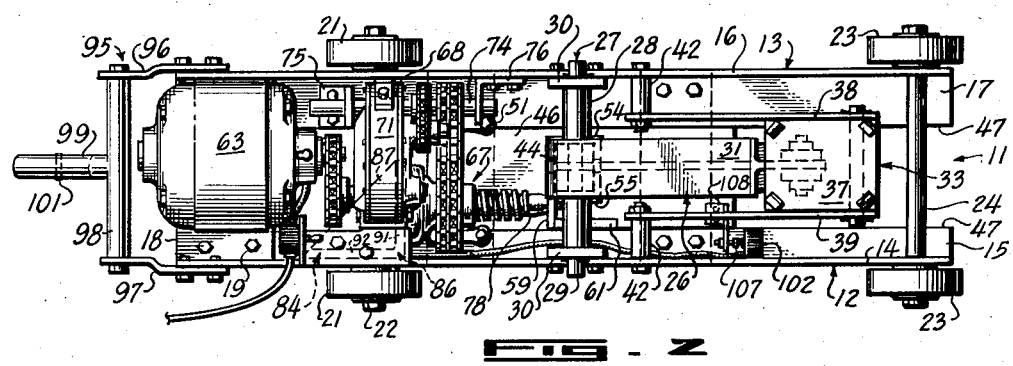
Figure 2 is a plan view.
Figure 3:
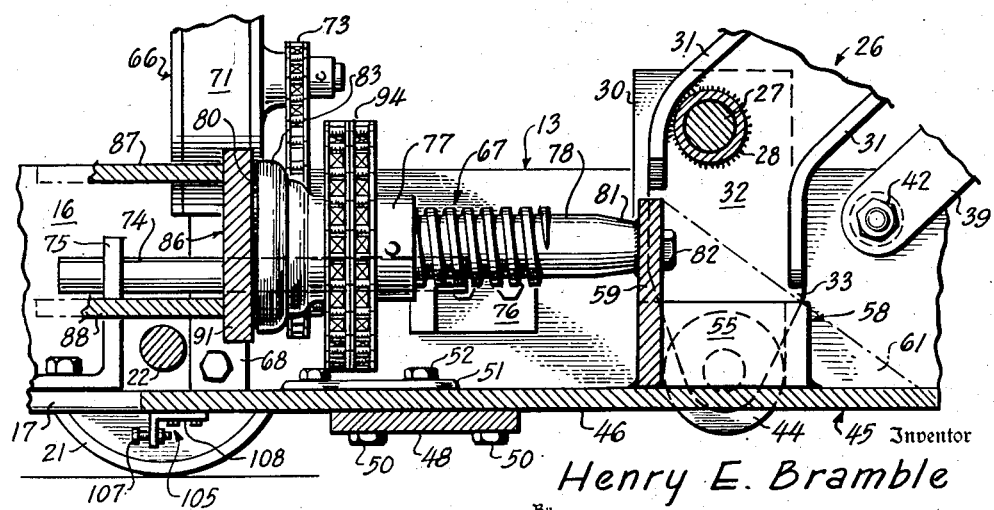
Figure 3 is a fragmentary view, enlarged, of a detail.

Having reference now in greater particularity to the drawings the present invention is shown as embodied in a truck structure, indicated generally by the numeral 10 which includes a chassis or frame 11 formed of a pair of spaced angle members 12 and 13. Angle member 12 includes a vertical flange 14 and a horizontal flange 15. Angle member 13 embodies a vertical flange 16, which lies in parallel opposition to vertical flange 14, and a horizontal flange 17. The horizontal flanges 15 and 17 of the angle members are inwardly directed, with horizontal flange 17 being of greater width than horizontal flange 15. A mounting plate 18 is located at the forward end of chassis 11 and is fixed to the horizontal flanges 15 and 17 by a number of bolts 19.

Mobility is afforded structure 10 through the provision of a forward pair of wheels 21, 21, mounted on an axle 22 which is journaled in a pair of oppositely disposed openings provided in vertical flanges 14 and 16, and a rearward pair of wheels 23, 23, carried by an axle 24, also journaled in suitable openings provided in the vertical flanges 14 and 16.

A load-lifting assembly 25 is operatively supported on chassis 11 between the forward and rearward pairs of wheels. Load-lifting assembly 25 includes a lifting or actuating lever 26 formed of an integral bell crank, and is pivotally mounted, between its ends, for movement between an elevated and a collapsed position, on a transverse shaft 27. Rotatable spacer sleeves 28, 28 welded at their inner ends to the bell crank 26 centers the latter on shaft 27. The ends 29 of the shaft 27 are journaled in horizontally spaced openings provided in a pair of opposed vertical supporting plates 30, 30. Supporting plates 30, 30 are suitably bolted, opposite one another, to the vertical flanges 14 and 16 of angle bars 12 and 13. Bell crank 26, as shown, embodies upper and lower transverse flanges 31, 31 interconnected by a vertical web 32. This construction effects a member having great strength and the ability to withstand very heavy loads. Load-lifting assembly 25 also includes a head member or saddle 33 pivotally connected at 34 to the outer end 35 of the longer bell crank arm 36 of lever 26. The upper or load-bearing surface 37 of the saddle 33 is maintained in a horizontal position at all times, as actuating lever 26 moves between an elevated and a collapsed position, by means of a pair of connecting links 38 and 39. These link members 38 and 39 are pivotally connected at their upper ends to saddle 33 by a transverse pivot pin 41, and have their lower ends pivotally connected to the vertical flanges 14 and 16 of angle members 12 and 13 by suitable pivot assemblies 42, 42. The arrangement of the pivots provided at 34 and 41 and at 27 and 42 relative to one another are such that the connecting links 38 and 39 lie parallel to longer bell crank arm 36 throughout the movements of actuating lever 26.

Upon the outer end of web 32 of the shorter bell crank arm 43 of actuating lever 26 there are suitably rotatably mounted a pair of wheels or rollers 44, 44 which assist in effecting movement of actuating lever 26, as will be described. To operate actuating lever 26 there is provided on chassis 11 an actuator member 45 formed of an elongated flat plate 46. This plate member 46 is horizontally disposed, for rectilinear movement, in the space between the longitudinal edges 47, 47 of the horizontal flanges 15 and 17 of angle members 12 and 13. To support the plate member 46 between the longitudinal edges 47, 47 of horizontal flanges 15 and 17 there is affixed to the bottom surfaces of these flanges a pair of transverse mounting plates 48 and 49 which are longitudinally spaced from one another. A plurality of bolts 50 hold the plates 48 and 49 secured. The actuator plate member 46 rests upon the upper surfaces of these mounting plates and is adapted to slide thereupon. To prevent the actuator plate member 46 from raising off the mounting plates 48 and 49 there is provided a pair of restraining members 51, 51 which are secured by bolts 52 to the upper surfaces of the horizontal flanges 15 and 17. The restraining members 51, 51 project over the upper surface of actuator plate member 46 and thereby, in cooperation with the transverse plates 48 and 49, serve to confine it in the channel afforded between longitudinal edges 47, 47 of horizontal flanges 15 and 17.

Spaced from the ends of the sides of the actuator plate member 46 is a rectangular shaped opening 53. In surrounding relationship to rectangular shaped opening 53 are upstanding side wall members 54 and 55 and upstanding transverse wall members 56 and 57. These various wall members are fixed to the upper surface of actuator plate member 46 by welding. The wall members 54, 55, 56 and 57 are of the same height and cooperate to effect an open-ended receptacle or conduit characterized as a whole by numeral 58, within which rollers 44, carried at the lower end of bell crank 26, are adapted to move. The diameter of rollers 44 is slightly less than the width of opening 53 whereby the rollers 44 are adapted to ride freely upon the interior surfaces of the transverse wall members 56 and 57 as the actuator plate member 46 is moved rectilinearly to operate the actuating lever 26 between its collapsed and its elevated positions. Thus the operative connection between the actuating lever 26 and the actuator plate member 46 is effected by the disposal of rollers 44 in the conduit 58. Through this operative connection the actuating lever 26, and thereby the load-lifting assembly 25, is readily, and rapidly, moved between raised and lowered positions. The top edges of the walls 56 and 57 are appropriately grooved, centrally, to permit ready insertion of the lower end of web 32 into the receptacle 58 and without binding on the walls 56 and 57.

An upstanding member 59 is welded to the upper surface of actuator plate member 46 and is located contiguous receptacle 58 in line with wall 57 thereof. Upstanding member 59 is of a greater height than the various wall members which comprise receptacle 58. A triangular shaped brace member 61 is welded at one of its sides to a face of upstanding member 59 and at a second side to the upper surface of actuator plate member 46 to afford strength and rigidity to this upstanding member. The purpose of upstanding member 59 will be hereinafter explained.

The mechanism, indicated generally by numeral 62, for operating actuator plate 46 and the load-lifting assembly 25 is carried upon the forward end of chassis 11. Mechanism 62 includes a conventional, reversible electric motor 63, the operation of which is controlled through a usual electric switch 64 supported on chassis 11 by a mounting bracket 65. The motor 63 is suitably fixed to mounting plate 18 by usual fastening means (not shown). Cooperating with motor 63 is a conventional reduction gear assembly 66 and a usual screw device 67. Reduction gear assembly 66 is located on chassis 11 between motor 63 and screw device 67 and is fixedly secured in position by the mounting bracket 65 to which it is suitably bolted and by a mounting strap 68 which is bolted to the casing 71 of reduction gear assembly 66 and to vertical flange 16 of angle member 13. Motor 63 is operatively connected to reduction gear assembly 66 through a usual gear and chain driving arrangement 72 for actuation of assembly 66. Reduction gear assembly 66 in turn is connected by a second gear and chain driving arrangement 73 to a shaft 74, which shaft is longitudinally positioned relative to chassis 11. Shaft 74 is supported for rotative movement by a pair of L-shaped mounting brackets 75 and 76, which brackets are located on opposite sides of the reduction gear assembly 66, with bracket 75 bolted to horizontal flange 17 and bracket 76 similarly fixed to vertical flange 16.

Screw device 67 consists of a conventional internally threaded transmission casing 77 and a usual horizontally disposed screw shaft 78 having one end threaded into casing 77. Casing 77 and screw shaft 78 are supported at right angles to upstanding wall member 59 and parallel to the upper surface of actuator plate 46 by the connection of end 81 of screw shaft 78 to upstanding wall member 59. End 81 is rigidly fixed to wall member 59 by welding. A stud 82 is suitably threaded through upstanding member 59 and into end 81 to reinforce the connection of screw shaft 78 to upstanding member 59.

The free end 83 of casing 77 suitably carries a graphite bearing plate 80 which presses against a stop member 84 which is rigidly affixed to vertical flange 14 of angle member 12 by a plurality of bolts 85. Stop member 84 is formed of an angle iron 86 having a pair of spaced, horizontally disposed, triangular bracing members 87 and 88 welded to the interior surfaces of the leg members 91 and 92 of angle iron 86. The bracing members 87 and 88 are provided to strengthen angle iron 86.

Upper triangular bracing member 87 also serves to support the mounting bracket 65, which is secured thereto by a number of bolts 93.

It is to be understood that the specific construction of the screw device 67 is not within the scope of this invention. It is contemplated that any screw device can be employed which includes an extendable and retractable screw shaft and a rotatable casing adapted to bear at its free end against a stop member.

To effect rotation of casing 77 and thereby retraction and extension of screw shaft 78, a gear and chain driving assembly 94 is suitably operatively connected to shaft 74 and casing 77.

To enable an operator to readily move structure 10 about, means 95 are provided at the forward end of chassis 11 to permit the attachment of a pull handle (not shown). The means 95 comprises a pair of outwardly extending brackets 96 and 97 which rotatively support a transverse shaft 98. From the shaft 98, intermediate its ends, outwardly projects a tubular portion 99 having a transverse pin 101 therein. Tubular portion 99 is adapted to accept an end of the pull handle (not shown). Pin 101 is adapted to fit into a bayonet slot in the pull handle to thereby connect the pull handle to the truck 10. It is understood that the specific method of connecting a removable pull handle to the tubular portion 99 forms no part of the present invention. Any usual connecting expedients may be utilized. It is preferred that the pull handle be detachable so that the structure 10 can occupy areas restricted in size and where a permanently attached handle would be a nuisance.

Means are provided to stop the operation of the motor 63 after the actuator plate 46 has been moved rearwardly the required distance to raise load-lifting assembly 25 to its elevated position, and again to arrest the motor 63 when the actuator plate 46 is moved in the reverse direction the necessary distance to lower load-lifting assembly 25 to its collapsed position. This means includes a pair of conventional electric limit switches 102 and 103 suitably mounted on chassis 11 at either end of the actuator plate 46 and electrically connected through usual electrical leads to electric switch 64 which controls the operation of motor 63. Switch operating assemblies 104 and 105 are conveniently supported on the actuator plate 46 at the ends thereof and each comprises an adjustable stud 107 carried by a bracket 108. As the actuator plate 46 is moved forwardly and rearwardly by screw device 67 it will alternately carry the switch operating assemblies 104 and 105 into engagement respectively with limit switches 102 and 103 to operate motor control switch 64 and terminate rotation of motor 63. The arrangement and parts herein described for controlling the operation of motor 63 is understood to be an example of but one means for performing this operation. It is understood that any suitable arrangement of switches and switch operators may be employed for determining the operation of the motor 63 after it has effected movement of the load-lifting assembly 25 to elevated or collapsed positions.

The operation of the lifting truck of this invention is as follows: With the load-lifting assembly 25 in lowered, or collapsed position, the truck 10 is rolled to the point of use to position the saddle 33 beneath an axle of an automobile or other device which is to be raised. Motor 63 is then started to effect rotation of casing 77 of the screw device 67 through the reduction gear assembly 66, the shaft 74 and the various gear and chain driving arrangements 72, 73 and 94. With casing 77 rotating the screw shaft 78 will be caused to move out of the casing 77. Casing 77 is maintained in engagement with stop member 84 by the weight of the load being lifted, but the construction of screw device 67 is understood to be such that even though maintained adjacent stop member 84 the casing 77 still is adapted to rotate. Therefore, as casing 77 is rotated it does not move away from stop member 84 but rather only screw shaft 78 is adapted to move longitudinally toward the rear of chassis 11 and away from stop member 84. Since the screw shaft 78 is connected to upstanding wall 59 which in turn is affixed to the actuator plate 46, movement of screw shaft 78 will effect movement of actuator plate 46 in the same direction. With the movement of actuator plate 46 rearwardly actuating lever 26, operatively connected to plate 46 by the disposal of rollers 44 within open-end receptacle 58, will be made to rotate in a counter-clockwise direction (as viewed in the drawings) about its pivot to gradually raise the saddle 33 and thereby elevate the load resting on the saddle 33. As the upper end 35 of bell crank actuating lever 26 rises into the air the lower end of the lever is moved downwardly with the rollers 44 riding within receptacle 58 and adapted to project through the opening 53 and below actuator plate 46 when the actuating lever 26 is moved to its full height. Rearward movement of the actuator plate 46 is halted, and the elevating of the load completed, when switch operating assembly 104 carried thereon engages its associated limit switch 102 to stop motor 63.

To lower the load, motor control switch 64 is operated to reverse electric motor 63 and thereby effect reverse operation of the gear and chain driving mechanisms to rotate casing 77 of screw device 67 in reverse direction and thereby withdraw screw shaft 78. This movement of screw shaft 78, in the direction of the forward end of chassis 11, will carry the actuator plate 46 with it. Actuator plate 46 now moving forwardly will rotate actuating lever 26 in a clock-wise direction. Rollers 44 will ride upwardly within receptacle 58 maintaining the operative connection between the load-lifting assembly 25 and the actuator plate 46. When load-lifting assembly 25 reaches its collapsed position the switch operating assembly 105 on actuator plate 46 engages its limit switch 103 to operate motor control switch 64 and stop motor 63.

While a preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. In a load lifting device having a frame, a saddle, a bell crank pivotally supported on the frame and connected at one end to said saddle for raising and lowering the same, means for actuating said bell crank comprising an actuator plate slidably mounted on said frame, roller means rotatably carried by the opposite end of said bell crank, spaced wall members on said actuator plate on which said roller means ride and cooperating with said roller means to operatively connect said bell crank to said actuator plate whereby the movement of the latter effects pivotal movement of the former, a reciprocable screw shaft connected to said actuator plate, and means to operate said screw shaft to move said actuator plate in opposite directions.

2. A load lifting device comprising a frame, a saddle, a lifting lever having a pivotal connection at one end with said saddle and adapted to raise and lower said saddle, means pivotally mounting said lifting lever on said frame, means for moving said lifting lever upon its pivot comprising an actuator plate mounted on the frame for rectilinear movement, roller means rotatably carried at the opposite end of said lifting lever, spaced wall members provided on said actuator plate between which said roller means are disposed and cooperating with said roller means to operatively connect said lifting lever to said actuator plate, a reciprocable screw shaft connected to said actuator plate, and means to actuate said screw shaft to move said actuator plate forward and back.

3. In a load lifting device having a wheel supported frame, a saddle, a bell crank pivotally connected to said saddle for raising and lowering the same, means pivotally supporting said bell crank between its ends on said frame, means for actuating said bell crank comprising roller means rotatably carried by said bell crank below its pivotal support, an actuator plate mounted for slidable movement on said frame and below said bell crank pivotal support, means on said actuator plate cooperating with said roller means for operatively connecting said bell crank to said actuator plate, a screw shaft on said actuator plate, a rotatable casing having threaded engagement with said screw shaft, a stop member supported by said frame engageable by said rotatable casing, and means for rotating said casing in opposite directions for extending and retracting said screw shaft to move said slidable actuator plate in opposite directions.

4. A load lifting device comprising an elongated frame, wheels at either end of said frame supporting the same, a saddle, a lifting lever pivotally mounted on said frame between the forward and rear wheels, having a pivotal connection with said saddle for raising and lowering it, means for actuating said lifting lever comprising an actuator plate, means mounting said actuator plate for slidable movement on said frame, means including roller means and a conduit within which the roller means is adapted to ride for operatively connecting said slidable actuator plate to said pivotal lifting lever, a screw shaft connected to said actuator plate, a rotatable casing having threaded engagement with said screw shaft, and means including an electric motor mounted on said frame at an end thereof operatively connected to said casing for rotating it in opposite directions for extending and retracting said screw shaft to move said actuator plate forward and back.

5. A load lifting device comprising an elongated frame, wheels at either end of said frame supporting the same, a saddle, a bell crank pivotally connected to said saddle for raising and lowering it, means pivotally supporting said bell crank, between its ends, on said frame intermediate the forward and rear wheels, means for actuating said bell crank comprising roller means rotatably carried by said bell crank below its pivotal support, an actuator plate, means mounting said actuator plate for slidable movement below said bell crank pivotal support, spaced wall members on said actuator plate engageable by said roller means and cooperating therewith to operatively connect said bell crank to said actuator plate, a screw shaft, means mounting said screw shaft on said actuator plate, a rotatable casing having threaded engagement with said screw shaft, a stop member supported by said frame engageable by said rotatable casing, and means including an electric motor mounted on said frame at an end thereof operatively connected to said casing for rotating it in opposite directions for extending and retracting said screw shaft to move said slidable actuator plate in opposite directions.

6. In a load lifting device having a frame, a saddle, a bell crank pivotally supported on the frame and connected at one end to said saddle for raising and lowering the same, link means pivotally mounted on said frame and pivotally connected to said saddle and arranged in cooperation with said bell crank to support said saddle with its upper surface in horizontal position while the saddle is being raised and lowered, means for actuating said lifting means comprising an actuator plate slidably mounted on said frame, roller means rotatably carried by the opposite end of said bell crank, spaced wall members on said actuator plate on which said roller means ride and cooperating with said roller means to operatively connect said bell crank to said actuator plate whereby the movement of the latter effects pivotal movement of the former, a reciprocable screw shaft connected to said actuator plate, and means to operate said screw shaft to move said actuator plate in opposite directions.

7. A load lifting device comprising a frame, a saddle, a lifting lever having a pivotal connection at one end with said saddle and adapted to raise and lower said saddle, means pivotally mounting said lifting lever on said frame, link means pivotally mounted on said frame and pivotally connected to said saddle and arranged in cooperation with said lifting lever to support said saddle with its upper surface in horizontal position while the saddle is being raised and lowered, means for moving said lifting lever upon its pivot comprising an actuator plate mounted on the frame for rectilinear movement, roller means rotatably carried at the opposite end of said lifting lever, spaced wall members provided on said actuator plate between which said roller means are disposed and cooperating with said roller means to operatively connect said lifting lever to said actuator plate, a reciprocable screw shaft connected to said actuator plate, and means to actuate said screw shaft to move said actuator plate forward and back.

8. A load lifting device comprising an elongated frame, wheels at either end of said frame supporting the same, a saddle, a lifting lever pivotally mounted on said frame between the forward and rear wheels, having a pivotal connection with said saddle for raising and lowering it, link means pivotally mounted on said frame and pivotally connected to said saddle and arranged in cooperation with said lifting lever to support said saddle with its upper surface in horizontal position while the saddle is being raised and lowered, means for actuating said lifting lever comprising an actuator plate, means mounting said actuator plate for slidable movement on said frame, means including roller means and a conduit within which the roller means is adapted to ride for operatively connecting said slidable actuator plate to said pivotal lifting lever, a screw shaft connected to said actuator plate, a rotatable casing having threaded engagement with said screw shaft, and means including an electric motor mounted on said frame at an end thereof operatively connected to said casing for rotating it in opposite directions for extending and retracting said screw shaft to move said actuator plate forward and back.

9. A load lifting device comprising an elongated frame, wheels at either end of said frame supporting the same, a saddle, a bell crank pivotally connected to said saddle for raising and lowering it, means pivotally supporting said bell crank, between its ends, on said frame intermediate the forward and rear wheels, link means pivotally mounted on said frame and pivotally connected to said saddle and in parallel relation to the longer arm of the bell crank and cooperating with said bell crank to support said saddle with its upper surface in horizontal position while the saddle is being raised and lowered, means for actuating said bell crank comprising roller means rotatably carried by said bell crank below its pivotal support, an actuator plate, means mounting said actuator plate for slidable movement below said bell crank pivotal support, spaced wall members on said actuator plate engageable by said roller means and cooperating therewith to operatively connect said bell crank to said actuator plate, a screw shaft, means mounting said screw shaft on said actuator plate, a rotatable casing having threaded engagement with said screw shaft, a stop member supported by said frame engageable by said rotatable casing, and means including an electric motor mounted on said frame at an end thereof operatively connected to said casing for rotating it in opposite directions for extending and retracting said screw shaft to move said slidable actuator plate in opposite directions.

10. In a load lifting device having a wheel supported frame, a saddle, a bell crank pivotally connected to said saddle for raising and lowering the same, means pivotally supporting said bell crank between its ends on said frame, link means pivotally mounted on said frame and pivotally connected to said saddle and in parallel relation to the longer arm of the bell crank and cooperating with said bell crank to support said saddle with its upper surface in horizontal position while the saddle is being raised and lowered, means for actuating said bell crank comprising roller means rotatably carried by said bell crank below its pivotal support, an actuator plate mounted for slidable movement on said frame and below said bell crank pivotal support, said actuator plate having an opening therethrough, wall members disposed adjacent said opening upon which said roller means is adapted to ride for movement into and out of said opening, said wall members cooperating with said roller means to operatively connect said bell crank to said actuator plate, a screw shaft, means mounting said screw shaft on said actuator plate, a rotatable casing having threaded engagement with said screw shaft, a stop member supported by said frame engageable by said rotatable casing, and means including an electric motor for rotating said casing in opposite directions for extending and retracting said screw shaft to move said slidable actuator plate in opposite directions.

HENRY E. BRAMBLE.

REFERENCES CITED

The following references are of record in the file of this patent:

UNITED STATES PATENTS

| Number | Name | Date |
|---|---|---|
| 1,559,099 | Hopkins | Oct. 27, 1925 |
| 1,844,585 | Manley | Feb. 9, 1932 |